United States Patent [19]
Michaud et al.

[11] Patent Number: 5,965,511
[45] Date of Patent: Oct. 12, 1999

[54] CLEANING OR DRYING COMPOSITIONS BASED ON 1,1,1,2,3,4,4,5,5,5-DECAFLUOROPENTANE

[75] Inventors: Pascal Michaud, Saint-Gratien; Jean-Jacques Martin, Bois-Colombes, both of France

[73] Assignee: Elf Atochem S. A., France

[21] Appl. No.: 09/016,426

[22] Filed: Jan. 30, 1998

[30] Foreign Application Priority Data

Feb. 4, 1997 [FR] France .................................... 97 01220

[51] Int. Cl.⁶ ................................ C11D 7/30; C11D 7/50; C23G 5/028; B01D 12/00
[52] U.S. Cl. ......................... 510/408; 510/177; 510/256; 510/273; 510/410; 510/411; 252/194
[58] Field of Search ...................... 510/408, 410, 510/411, 177, 256, 273; 252/194

[56] References Cited

U.S. PATENT DOCUMENTS

| | | | |
|---|---|---|---|
| 5,064,560 | 11/1991 | Merchant | 252/67 |
| 5,196,137 | 3/1993 | Merchant | 252/67 |
| 5,514,301 | 5/1996 | Bil et al. | 510/256 |
| 5,531,916 | 7/1996 | Merchant | 510/412 |
| 5,714,298 | 2/1998 | Barthelemy et al. | 430/124 |
| 5,762,817 | 6/1998 | Merchant et al. | 510/410 |

FOREIGN PATENT DOCUMENTS

| | | |
|---|---|---|
| 5148498 | 6/1993 | Japan . |
| 5-214377 | 8/1993 | Japan . |
| 5214377 | 8/1993 | Japan . |
| 5-263310 | 10/1993 | Japan . |
| 5263310 | 10/1993 | Japan . |
| 6-266005 | 8/1994 | Japan . |
| 6226005 | 8/1994 | Japan . |
| 97/25461 | 7/1997 | WIPO . |

*Primary Examiner*—Christine Skane
*Attorney, Agent, or Firm*—Bell, Boyd & Lloyd

[57] ABSTRACT

In order to replace compositions based on CFC or on HCFC in applications for cleaning or drying solid surfaces (in particular defluxing), the invention proposes azeotropic or virtually azeotropic compositions based on 1,1,1,2,3,4,4,5,5,5-decafluoropentane, methylene chloride and optionally methanol.

7 Claims, No Drawings

CLEANING OR DRYING COMPOSITIONS BASED ON 1,1,1,2,3,4,4,5,5,5-DECAFLUOROPENTANE

FIELD OF THE INVENTION

The present invention relates to the field of fluoro hydrocarbons and, more particularly, its subject is novel compositions which may be used to clean or dry solid surfaces.

BACKGROUND OF THE INVENTION 1,1,2-Trichloro-1,2,2-trifluoroethane (known in the trade under the name F113) has been widely used in industry to clean and degrease very varied solid surfaces made of metal, glass, plastic, composites) Besides its application in electronics in the cleaning of soldering fluxes in order to remove the stripping flux which adheres to printed circuits, mention may be made of its applications in the degreasing of heavy metal articles and in the cleaning of high-quality and high-precision mechanical components such as, for example, gyroscopes and military, aerospace or medical equipment. In its various applications, F113 is usually combined with other organic solvents (for example methanol), preferably in the form of azeotropic or virtually azeotropic mixtures which do not demix and which, when used at reflux, have substantially the same composition in the vapour phase as in the liquid phase.

F113 is also used in operations to dry or dewet surfaces by means of hydrophobic surfactants.

However, the use of compositions based on F113 is now banned since F113 is among the chlorofluorocarbons (CFCs) which are suspected of attacking or degrading stratospheric ozone.

In these various applications, F113 may be replaced by 1,1-dichloro-1-fluoroethane (known under the name F141b), but the use of this substitute is already regulated since, although low, its destructive effect on ozone is not non-existent.

DESCRIPTION OF THE INVENTION

In order to contribute towards solving this problem, the present invention proposes to replace compositions based on F113 or on F141b by azeotropic or virtually azeotropic compositions based on 1,1,1,2,3,4,4,5,5,5-decafluoropentane. This compound (known under the name 43-10 mee) is totally free of any destructive effect on ozone.

The compositions to be used according to the invention comprise, on a weight basis, 10 to 90% of 43-10 mee, 10 to 90% of methylene chloride and optionally 0 to 10% of methanol.

A binary composition which is particularly preferred according to the invention is that which comprises, on a weight basis, 40 to 60% of 43-10 mee and 60 to 40% of methylene chloride. In this field, an azeotrope exists whose boiling point is 34.20° C. at normal atmospheric pressure (1.013 bar).

A ternary composition according to the invention advantageously comprises, on a weight basis, 30 to 69% of 43-10 mee, 69 to 30% of methylene chloride and 1 to 10% of methanol. A ternary composition containing 39 to 59% of 43-10 mee, 59 to 39% of methylene chloride and 2 to 8% of methanol is more particularly preferred. In this field, an azeotrope exists whose boiling point is 33.2° C. at normal atmospheric pressure.

The compositions according to the invention have no flashpoint under the standard determination conditions (ASTM standard D 3828) and thus make it possible to work in total safety.

As in the known cleaning compositions based on F113 or on F141b, the cleaning compositions based on 43-10 mee according to the invention may, if so desired, be stabilized against hydrolysis and/or light metals and/or radical attacks which may occur in the cleaning processes, by adding a common stabilizer thereto such as, for example, nitroalkanes (nitromethane, nitroethane, nitropropane, etc.) acetals (dimethoxymethane) and ethers (1,4-dioxane, 1,3-dioxolane), it being possible for the proportion of stabilizer to range from 0.01 to 5% relative to the total weight of the composition. It is preferred to use dimethoxymethane as stabilizer, the boiling point of which is close to that of the azeotropic compositions according to the invention; consequently, this stabilizer follows the cycle of the solvent fully, which is particularly advantageous in cleaning applications.

The compositions according to the invention may be used in the same applications and according to the same techniques as the prior compositions based on F113 or on F141b.

The binary azeotropic mixture is particularly suitable for operations to dry or dewet surfaces when a hydrophobic surfactant which is soluble in the composition is used. Such a type of composition comprising from 0.05 to 8% by weight of surfactant allows the complete removal of water from the surfaces to be treated. As examples of hydrophobic surfactants, mention may be made more particularly of the diamides of general formula

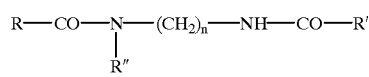

in which n is a number ranging from 2 to 6 (preferably 3) and the symbols R, R' and R", which may be identical or different, each represent a fatty aliphatic chain containing 12 to 30 carbon atoms, preferably 15 to 25.

EXAMPLES

The examples which follow illustrate the invention without limiting it.

Example 1

100 g of 43-10 mee and 100 g of methylene chloride (CM2) are introduced into the boiling vessel of a distillation column (30 plates). The mixture is then placed under full reflux for one hour in order to bring the system to equilibrium.

A fraction of about 50 g is collected at the steady temperature and this fraction is analyzed by gas chromatography.

Examination of the results, given in the table below, indicates the presence of a 43-10 mee/CM2 azeotrope since the fraction collected has the same composition as the initial mixture. This is a positive azeotrope since its boiling point is less than that of the 43-100 mee (55° C.) and that of the CM2 (40° C.).

|  | Composition (% by weight) | |
| --- | --- | --- |
|  | 43-10 mee | CM2 |
| Initial mixture | 50 | 50 |
| Fraction collected at 34.2° C. | 50 | 50 |

When used to clean soldering flux or in the degreasing of mechanical components, this azeotrope gives good results.

Example 2

Composition Stabilized with Dimethoxymethane (methylal)

150 g of a mixture containing, on a weight basis, 49.7% of 43-10 mee, 49.8% of CM2 and 0.5% of methylal as stabilizer are introduced into a small ultrasound cleaning tank. After the system has been placed at reflux for one hour, an aliquot of the vapour phase is taken. Its analyzis by gas chromatography shows the presence of methylal, which indicates that the mixture is stabilized in the vapour phase.

|  | Composition (% by weight) | | |
| --- | --- | --- | --- |
|  | 43-10 mee | CM2 | methylal |
| Initial mixture | 49.7 | 49.8 | 0.5 |
| Vapour phase | 49.7 | 49.8 | 0.5 |

Example 3 a) Demonstration of a 43-10 mee/CM2/methanol azeotrope 100 g of 43-10 mee, 100 g of CM2 and 50 g of methanol are introduced into the boiling vessel of a distillation column (30 plates). The mixture is then placed under full reflux for one hour in order to bring the system to equilibrium. At the steady temperature, a fraction of about 50 g is collected and is analyzed by gas chromatography.

Examination of the results, given in the table below, indicates the presence of an azeotropic composition.

|  | Composition (% by weight) | | |
| --- | --- | --- | --- |
|  | 43-10 mee | CM2 | methanol |
| Starting mixture | 40 | 40 | 20 |
| Fraction collected at 33.2° C. | 48.5 | 48.5 | 3 | b) Verification of the azeotropic composition 200 g of a mixture comprising 48.5% of 43-10 mee, 48.5% of CM2 and 3% of methanol are introduced into the boiling vessel of an adiabatic distillation column (30 plates). The mixture is then maintained at reflux for one hour in order to bring the system to equilibrium, after which a fraction of about 50 g is withdrawn and analyzed by gas chromatography.

The results, given in the table below, show the presence of a positive azeotrope since its boiling point is less than those of its three components.

|  | Composition (% by weight) | | |
| --- | --- | --- | --- |
|  | 43-10 mee | CM2 | $CH_3OH$ |
| Initial mixture | 48.5 | 48.5 | 3 |
| Fraction collected | 48.5 | 48.5 | 3 |

Boiling point corrected for 1.013 bar: 33.2° C.

This azeotrope gives good results when used to clean soldering flux or to degrease mechanical components.

As in Example 2, the above azeotropic composition may be stabilized with 0.5% dimethoxymethane.

Example 4

Cleaning of Soldering Flux

Five test circuits (standardized model IPC-B-25) are coated with rosin-based flux (R8F flux from the Company Alphametal) and annealed in an oven at 220° C. for 30 seconds.

These circuits are cleaned using the azeotropic composition of Example 3, in a small ultrasound machine for 3 minutes by immersion and 3 minutes in the vapour phase.

The cleaning is evaluated according to the standardized procedure IPC 2.3.26 using a precision conductimeter. The value obtained, 1.9 $\mu g/cm^2$ eq. NaCl, is very much lower than the ionic impurity threshold tolerated by the profession (2.5 $\mu g/cm^2$ eq.NaCl).

Example 5

Drying 250 ml of a drying composition comprising, on a weight basis, 99.8% of the binary mixture described in Example 1 and 0.2% of N,N'-dioleoyl-N-oleylpropylenediamine are prepared.

A stainless-steel grille 5×3 cm in size is dipped into water and is then immersed in the drying composition for 30 seconds while stirring manually.

The residual water, assayed by the Karl Fischer method, indicates the removal of 100 % of the water.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims.

We claim:

1. Azeotropic or virtually azeotropic composition consisting of, on a weight basis, 40 to 60% of 1,1,1,2,3,4,4,5,5,5-decafluoropentane, 60 to 40% of methylene chloride and 0 to 10% of methanol and optionally at least one stabilizer or hydrophobic surfactant wherein said composition boils at 34.2° C. at atmospheric pressure.

2. Azeotropic or virtually azeotropic composition consisting of, on a weight basis, 30 to 69% of 1,1,1,2,3,4,4,5,5,5-decafluoropentane, 69 to 30% of methylene chloride and 1 to 10% methanol and optionally at least one stabilizer or hydrophobic surfactant wherein said composition boils at 33.2° C. at atmospheric pressure.

3. Composition according to claim 1 or claim 2, wherein the stabilizer is dimethoxymethane.

4. Composition according to claim 1 or claim 2 wherein the weight proportion of surfactant is between 0.05 and 8%.

5. Method for cleaning solid surfaces, comprising cleaning with the composition according to claim 1 or claim 4 by defluxing printed circuits or degreasing mechanical components.

6. Method for treating solid surfaces, comprising drying or dewetting solid surfaces with the composition according to claim 1 or claim 2.

7. Composition according to claim 2, wherein the ternary mixture is 39 to 59% decafluoropentane, 59 to 39% methylene chloride, and 2 to 8% methanol.

* * * * *